United States Patent [19]

Heinz

[11] Patent Number: 5,465,563
[45] Date of Patent: Nov. 14, 1995

[54] LAWN MOWER WITH ROTATABLE WHEELS

[76] Inventor: William Heinz, 2116 Otter Lake Road, R.R.#3, Armstrong, British Columbia, Canada, V0E 1B0

[21] Appl. No.: 335,361

[22] Filed: Nov. 3, 1994

[51] Int. Cl.⁶ .................................................. A01D 34/82
[52] U.S. Cl. ................................. 56/17.2; 56/320.2
[58] Field of Search ........................... 56/16.7, 17.2, 56/320.1, 320.2, DIG. 20

[56] References Cited

U.S. PATENT DOCUMENTS

| | | | |
|---|---|---|---|
| 2,329,185 | 9/1943 | Coddington | 56/320.1 |
| 2,709,602 | 5/1955 | Orr, Sr. | 56/17.2 X |
| 2,857,725 | 10/1958 | Canfield | 56/320.1 |
| 3,093,947 | 6/1963 | Whitman | 56/17.2 |
| 4,916,889 | 4/1990 | Molstad | 56/320.1 X |
| 5,187,926 | 2/1993 | Rhoads | 56/16.7 |

*Primary Examiner*—George A. Suchfield
*Attorney, Agent, or Firm*—Adrian D. Battison; Murray E. Thrift; Stanley G. Ade

[57] ABSTRACT

A lawn mower is provided which has one or more rotatable wheels on one side of the mower shroud enabling the mower to cut grass at the edge of gardens and around obstructions.

4 Claims, 3 Drawing Sheets

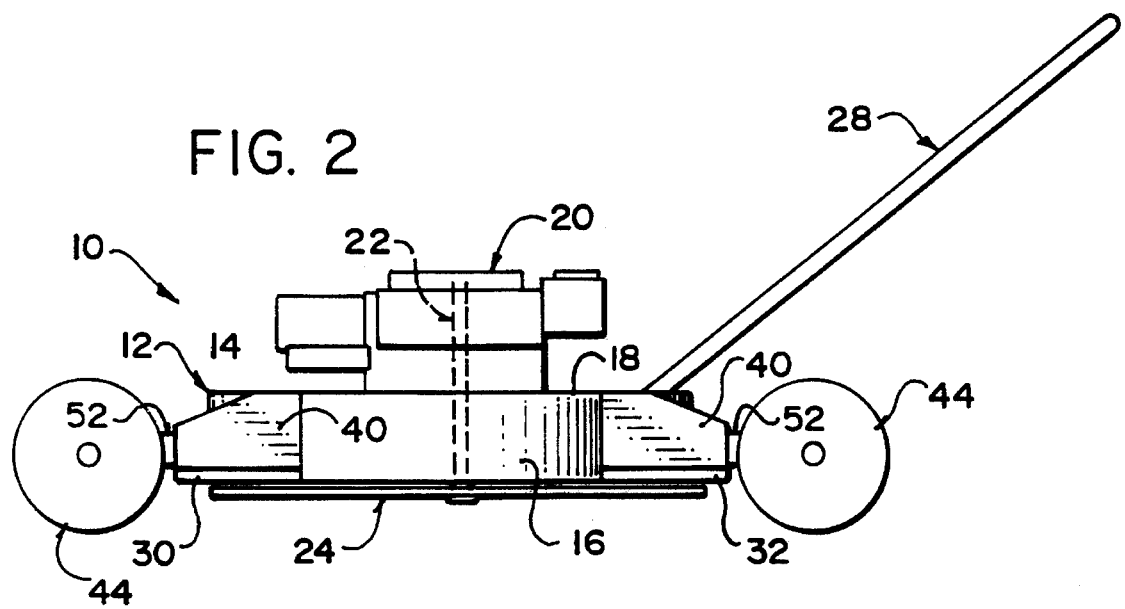
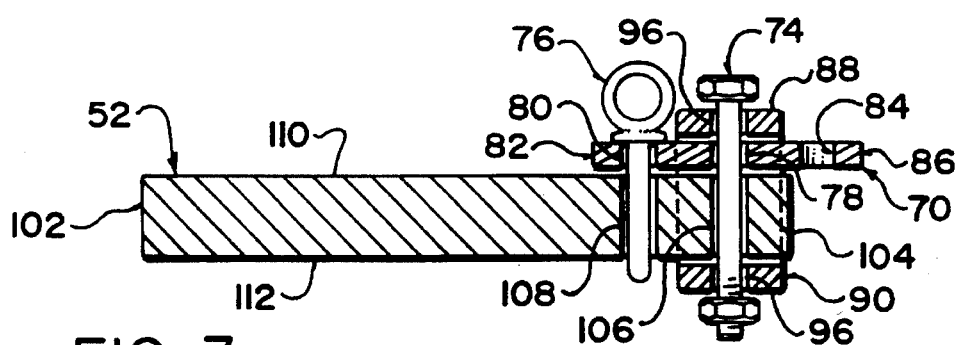
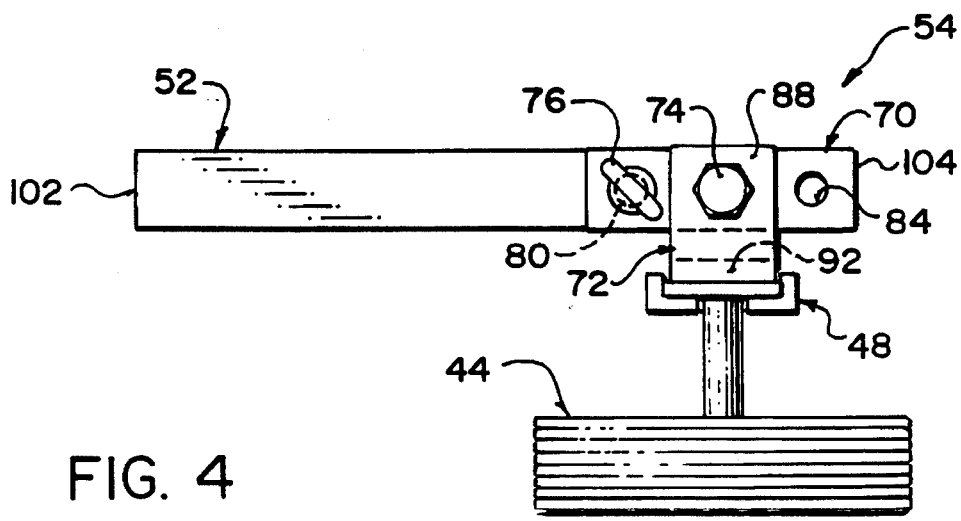

1

LAWN MOWER WITH ROTATABLE WHEELS

BACKGROUND OF THE INVENTION

When cutting grass with a lawn mower there is usually grass left around the edges of buildings, trees, gardens, side walks etc. that the lawn mower did not cut. This is due to the wheels of the mower extending past the outside edge of the mower shroud and sweep of the mower blade. The wheels come in contact with these obstructions preventing the mower blade from cutting the grass immediately around the obstruction.

To solve this problem a variety of additional specialized devices have been developed to make it possible to get at and cut this grass. This is however more time consuming and expensive than if the lawn mower where able to cut all the grass on the first go around.

A lawn mower is needed which can get at grass normally left around the edges of buildings, trees, gardens, and side walks by ordinary lawn mowers thereby eliminating the necessity of having to resort to the use of secondary equipment.

SUMMARY OF THE INVENTION

According to one aspect of the invention there is provided a lawn mower comprising a mower shroud having a top wall and a depending outer wall around an outer edge of the top wall for containing an area to be mowed, a drive motor mounted on the top wall and providing a drive shaft extending downwardly from the top wall, a mower blade mounted on the drive shaft for effecting mowing in a mowing area underneath the shroud, the mowing area being defined by a circle swept by the mower blade, a push handle connected to the shroud and extending upwardly and rearwardly therefrom for manually grasping by the operator for guiding the mower shroud in movement in a direction of movement across ground to be mowed, and four wheels each mounted on the shroud for supporting the shroud in said movement across the ground, a first pair of the wheels being provided on one side of the mower shroud at forward and rearward positions respectively thereon and a second pair of the wheels being provided on a second side of the mower shroud at forward and rearward positions thereon respectively, at least a forward one of the second pair of wheels being adjustable from a first position in which a line of movement of the wheel lies outside of a line tangential to the swept circle and parallel to the direction of movement to a second position in which said line of movement lies inward of said line so as to define in said second position a portion of the swept circle lying outside said line of movement for trimming of an edge of an area to be mowed by said mowing area.

Preferably each of the second pair of wheels is adjustable from the first position to the second position.

Preferably each of the second pair of wheels is adjustable from the first position to the second position and wherein a rearward one of said second pair of wheels includes mounting means comprising a horizontal second bar extending rearwardly of the shroud and a second wheel support bracket pivotally mounted on the second bar for pivotal movement through 180° about a vertical pivot axis so as to move the rearward one of said second pair of wheels from the first position to the second position.

Preferably the bar is mounted on the shroud at a fixed height relative thereto and wherein there is provided on the wheel bracket height adjustment means for adjusting the height of the wheel relative to the bar.

Preferably the shroud includes wheel mounting flanges extending from the shroud forwardly and rearwardly relative thereto and wherein the bar is mounted on the wheel mounting flange.

One embodiment of the invention will now be described in conjunction with the accompanying drawings in which:

BRIEF DESCRIPTION OF THE DRAWINGS

FIG. 2 is a side view of the lawn mower.

FIG. 3 is a cross sectional side view of the wheel support bracket.

FIG. 4 is a top view of the wheel support bracket.

In the drawings like characters of reference indicate corresponding parts in the different figures.

DETAILED DESCRIPTION

Figure 1:
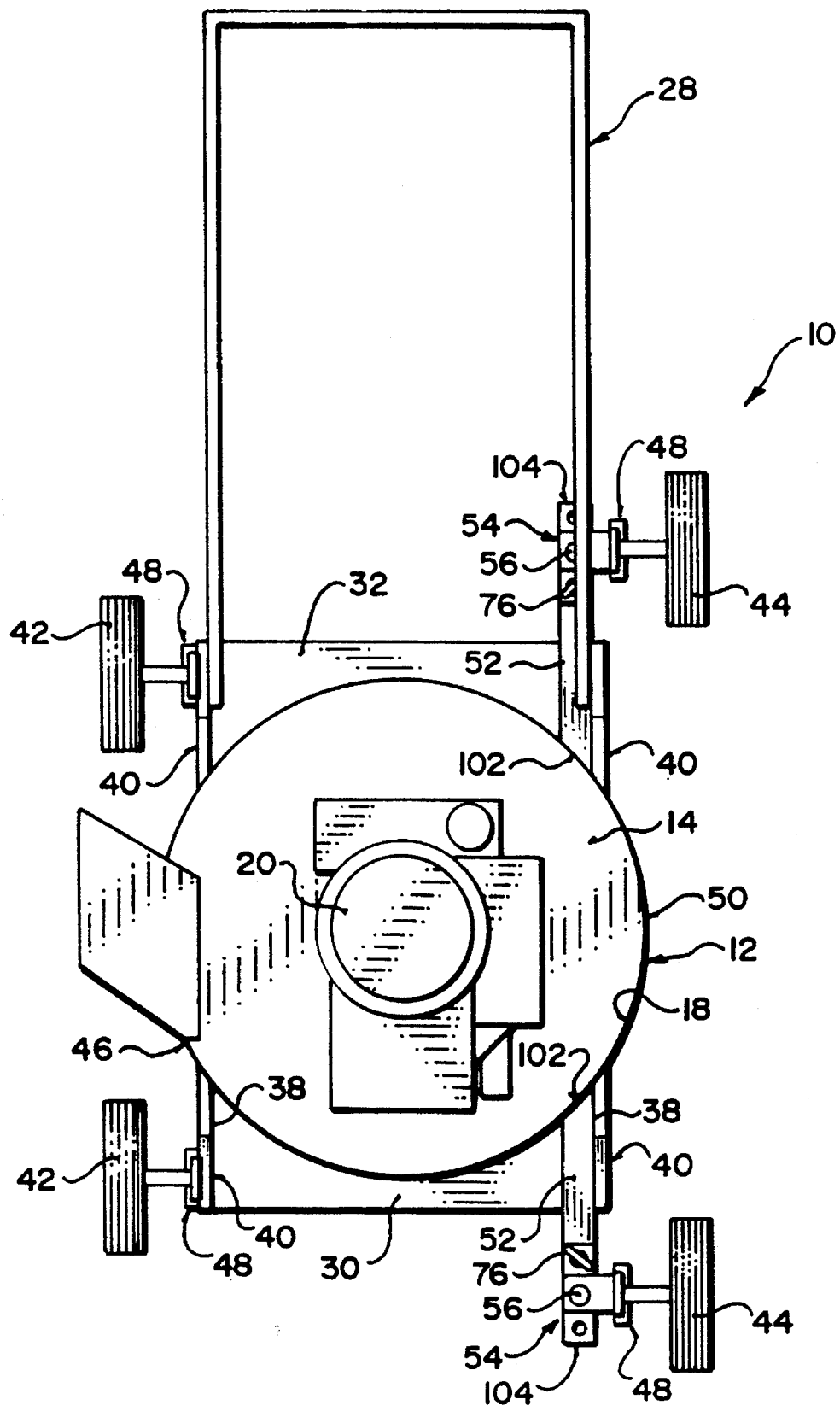
FIG. 1 is a top view of the lawn mower.
Figure 5:
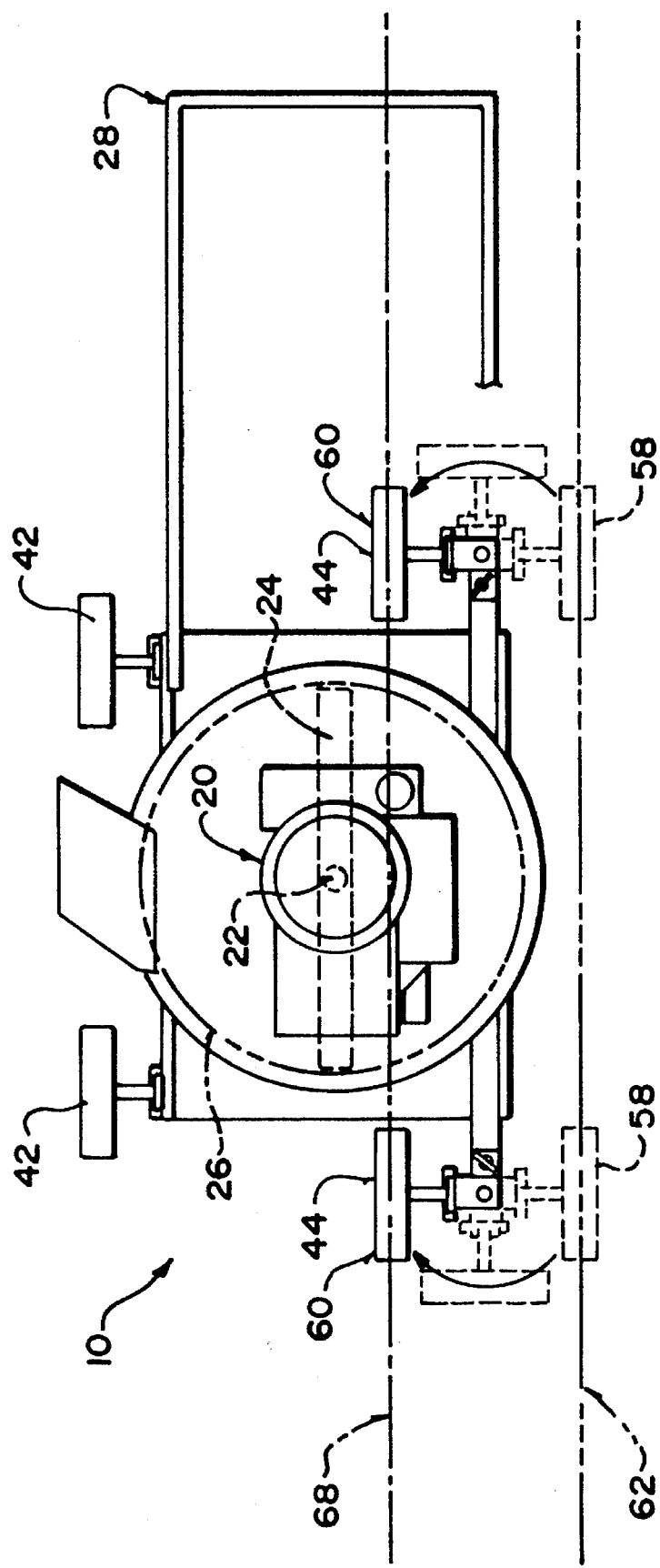
FIG. 5 is a top view of the lawn mower showing the wheels being rotated.

Referring to the accompanying figures the lawn mower is shown generally at 10. The lawn mower includes a mower shroud 12 with a top wall 14 and an outer wall 16 extending down around an outer edge 18 of the top wall. The outer wall 16 encloses an area of grass to be mowed. A drive motor 20 is mounted on top of the top wall 14 and has a drive shaft 22 which extends down through the top wall 14 into the interior of the mower shroud. A mower blade 24 is mounted on the drive shaft 22 for effecting mowing in the mowing area underneath the shroud 12. The mowing area is defined by a circle 26 swept by the mower blade 24 as it turns about the drive shaft 22. A push handle 28 is connected to the shroud 12 and extends upwards and rearwards. The handle 28 is manually grasped by an operator for guiding the lawn mower as it is moved in a direction of movement across the ground being mowed.

The shroud 12 includes wheel mounting flanges 30, 32 which extend horizontally to the front and rear of the shroud. On each side edge 38 of both the front 30 and rear 32 flanges is an upwardly projecting mounting plate 40.

Four wheels 42 and 44 are mounted on the shroud 12 for supporting the shroud in movement across the ground. A first pair of the wheels 42 are fixed on a first side 46 of the mower shroud 12 at forward and rearward positions respectively. The first pair of wheels 42 is fixed to a height adjustment mechanism 48 which is fixed in turn to the upwardly projecting mounting plate 40 on the front and rear flanges respectively. The height adjustment mechanism 48 is for adjusting the height of the wheel 42 relative to the mounting plate 40 and thereby the shroud 12.

A second pair of the wheels 44 is also provided on a second side 50 of the mower shroud 12 at forward and rearward positions. Each wheel 44 is likewise fixed to a height adjustable mechanism 48. On the second side the height adjustment mechanism 48 adjusts the height of the wheel 44 relative to the horizontal bar 52. The height adjustable mechanism 48 on the second side is fixed to a wheel support bracket 54.

Each wheel support bracket 54 is pivotally mounted on a horizontal bar 52 and is rotatably adjustable for pivotal movement through 180° about a vertical pivot axis 56 so as to move the wheel 44 from a first position 58 to a second position 60. In the first position 58 the line of movement of the wheel 62 lies outside of a line tangential to the swept 26 circle of the mower blade 24 and parallel to the direction of movement of the lawn mower. In the second position 60 the new line of movement of the wheel 68 lies inward of the line of movement of the wheel 66 when in the first position, bringing the new line of movement of the wheel 68 within a portion of the circle 26 swept by the mower blade 24. This arrangement enables the operator to bring the mower in close to obstructions so that the mower blade may cut the grass around the edge of the obstruction.

The wheel support bracket 54 comprises a horizontal rectangular plate 70, a channel member 72, a vertical pivotal connector 74 usually a bolt or pin, and a retaining pin 76. The horizontal rectangular plate 70 has three holes in it arranged such that one hole 78 is located at the center of the plate, a second hole 80 is located near to and spaced from one end 82 of the plate, and a third hole 84 is located near to and spaced from the opposite end 86 of the plate.

The channel member 72 is arranged such that its two arms 88 and 90 extend generally in the horizontal plane and the member 92 joining the arms lies generally in the vertical plane. Each height adjustable mechanism 48 and wheel 44 is fixed to the joining member 92 of the channel 72 on the face opposite the arms 88 and 90 such that the arms project away from the height adjustable mechanism 48 and wheel 44. A hole 96 is located in each of the arms aligned vertically with respect to one another.

The upper arm 88 of the channel 72 is fixed to the horizontal rectangular plate 70 such that the horizontal rectangular plate 70 is perpendicular to the channel arms 88 and 90 and the hole 96 on the upper arm is aligned with the center hole 78 in the horizontal rectangular plate and the upper and lower arms of the channel extend over the horizontal rectangular plate and below the horizontal bar.

On the second side 50 of the shroud 12 a horizontal bar 52 is fixed to each of the forward and rear upwardly projecting mounting plates 40 thereby mounting the horizontal bar 52 on the shroud 12 at a fixed height relative thereto. The front horizontal bar 52 is fixed at one end 102 and extends forwardly of the shroud cantilevering out in front of the lawn mower to a free end 104. The rear horizontal bar 52 is likewise fixed at one end 102 and extends rearwardly of the shroud cantilevering out behind the lawn mower to a free end 104. On each bar 52 at its free end 104 are two holes 106 and 108 which pass vertically through the bar 52 from its top surface 110 to its bottom surface 112. The holes 106 and 108 are located generally centrally across the width of the bar and are spaced from the end 104 and longitudinally along the bar. The holes 106 and 108 are further arranged so as to align with the holes in the plate 78, 80 and 84 such that the center hole 78 on the plate aligns with hole 106 nearest the free end of the bar and the second hole 108 in the bar aligns with one of the second or third holes 80 and 84 in the plate.

A bolt 74 or pin is arranged to pass through the holes in the channel arms 96, center hole of the plate 80 and the hole nearest the free end 106 of the bar creating a pivot connection about which the wheel support bracket 54 may rotate.

A retaining pin 76 is arranged to pass through either the second 80 or third 84 hole in the plate into the second hole 108 in the bar holding the wheel support bracket 54 fixed preventing rotation. When the wheel 44 is in the first position 58 the retaining pin 76 passes through the second hole 108 of the bar and the second hole 80 of the wheel support bracket 54. When the wheel is in the second position 60 the retaining pin 76 passes through the second hole 108 of the bar and the second hole 84 of the wheel support bracket 54. The retaining pin 76 is removable and reengagable within the holes.

To rotate the front or rear wheel 44 from the first position 58 to the second position 60 the retaining pin 76 is removed from the second hole 80 in the plate and the second hole in the bar 108. The wheel support bracket 54 and thereby the wheel 44 is pivoted about the bolt 74 forming the vertical pivot connection into the second position 60 where the third hole 84 in the horizontal rectangular plate is in alignment with the hole 108 in the bar. The retaining pin 76 is then replaced in the hole 108 in the bar and the third hole 84 in the horizontal rectangular plate holding the wheel 44 support fixed in the second position 60.

In an alternative embodiment only the forward one of the second pair of wheels is rotatably adjustable.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A lawn mower comprising a mower shroud having a top wall and a depending outer wall around an outer edge of the top wall for containing an area to be mowed, a drive motor mounted on the top wall and providing a drive shaft extending downwardly from the top wall, a mower blade mounted on the drive shaft for effecting mowing in a mowing area underneath the shroud, the mowing area being defined by a circle swept by the mower blade, a push handle connected to the shroud and extending upwardly and rearwardly therefrom for manually grasping by the operator for guiding the mower shroud in movement in a direction of movement across ground to be mowed, and four wheels each mounted on the shroud for supporting the shroud in said movement across the ground, a first pair of the wheels being provided on one side of the mower shroud at forward and rearward positions respectively thereon and a second pair of the wheels being provided on a second side of the mower shroud at forward and rearward positions thereon respectively, each of the second pair of wheels including mounting means for mounting the respective one of the second pair of wheels on the mower shroud so as to be adjustable from a first position in which a line of movement of the wheel lies outside of a line tangential to the swept circle and parallel to the direction of movement to a second position in which said line of movement lies inward of said line so as to define in said second position a portion of the swept circle lying outside said line of movement for trimming of an edge of an area to be mowed by said mowing area, the first pair of wheels being located at a fixed position on the shroud in which a line of movement of the first pair of wheels lies outside of a line tangential to the swept circle and parallel to the direction of movement, said mounting means of said forward one of said second pair of wheels comprising a first horizontal bar mounted on the shroud and extending forwardly of the shroud, said mounting means of said rearward one of said second pair of wheels comprising a second horizontal bar mounted on the shroud and extending rearwardly of the shroud, and each of said mounting means including a wheel support bracket pivotally mounted on the respective horizontal bar for pivotal movement through 180° about a vertical pivot axis so as to move the wheel from the first position to the second position.

2. The lawn mower according to claim 1 wherein the first and second horizontal bars are mounted on a common line parallel to the tangential line.

3. The lawn mower according to claim 1 wherein the bar is mounted on the shroud at a fixed height relative thereto and wherein there is provided on the wheel bracket height adjustment means for adjusting the height of the wheel relative to the bar.

4. The lawn mower according to claim 1 wherein the shroud includes wheel mounting flanges extending from the shroud forwardly and rearwardly relative thereto and wherein the bar is mounted on the wheel mounting flange.

* * * * *